United States Patent [19]

Rotmans

[11] 4,131,246

[45] Dec. 26, 1978

[54] THRUST VECTOR CONTROL ACTUATION SYSTEM

[75] Inventor: Richard J. Rotmans, Saugus, Calif.

[73] Assignee: Textron Inc., Providence, R.I.

[21] Appl. No.: 765,713

[22] Filed: Feb. 4, 1977

[51] Int. Cl.² ............................................... F02K 1/20
[52] U.S. Cl. .................................... 244/3.22; 60/230; 239/265.19
[58] Field of Search ................ 244/3.21, 3.22; 60/230; 239/265.19

[56] References Cited

U.S. PATENT DOCUMENTS

| | | | |
|---|---|---|---|
| 2,850,977 | 9/1958 | Pollak | 244/3.22 |
| 3,096,049 | 7/1963 | Karasinski | 60/230 |
| 3,786,993 | 1/1974 | Burgess et al. | 239/265.19 |

Primary Examiner—Verlin R. Pendegrass
Attorney, Agent, or Firm—Nilsson, Robbins, Dalgarn, Berliner, Carson & Wurst

[57] ABSTRACT

Four spoiler blades are pivotally mounted at the nozzle exit end of a rocket motor with opposed pairs of said spoiler blades connected to a single control means for positioning one or the other of said opposed pairs of spoiler blades in the nozzle exit thereby to position the rocket motor responsive to the exhaust gases impacting upon the spoiler blade.

6 Claims, 3 Drawing Figures

THRUST VECTOR CONTROL ACTUATION SYSTEM

BACKGROUND OF THE INVENTION

Thrust vector control systems are well known in the prior art including those wherein spoiler blades are utilized to effect such control. In all known prior art thrust vector control actuation systems a separate control member is connected to each of the spoiler blades to insert or retract the spoiler blade with respect to the nozzle exit thereby to effect the desired control of the apparatus upon which the rocket motor is mounted.

Obviously such separate control means which usually includes a hydraulic actuator and an electrohydraulic servo valve for each of the spoiler blades adds weight and complicates the actuation system. The prior art known to applicant includes U.S. Pat. Nos. 3,786,993 and 2,850,977.

SUMMARY OF THE INVENTION

A thrust vector control system in accordance with the present invention includes a pair of controlled spoiler blades pivotally attached adjacent the nozzle exit end of a rocket motor. A single force applying means is connected through appropriate linkage means to individually move one of said control spoiler blades thereby to extend or retract the same into the nozzle exit.

In accordance with a more specific aspect of the present invention there is provided two pairs of controlled spoiler blades each disposed in opposed relationship and pivotably attached against the nozzle end of the rocket motor. The spoiler blades are disposed so as to position a spoiler blade at 90° intervals about the nozzle exit. A single force applying means is connected through appropriate linkage to opposed pairs of said spoiler blades. The force applying means preferably takes the form of a hydraulic actuator means pivotally connected between one of the opposed spoiler blades and a crank means while a pushrod is pivotally connected between the other of said spoiler blades and the crank means, whereby reciprocation of said hydraulic actuator means individually moves one of said control spoiler blades to extend or retract the same with respect to said nozzle exit.

DETAILED DESCRIPTION OF THE INVENTION

Figure 1:
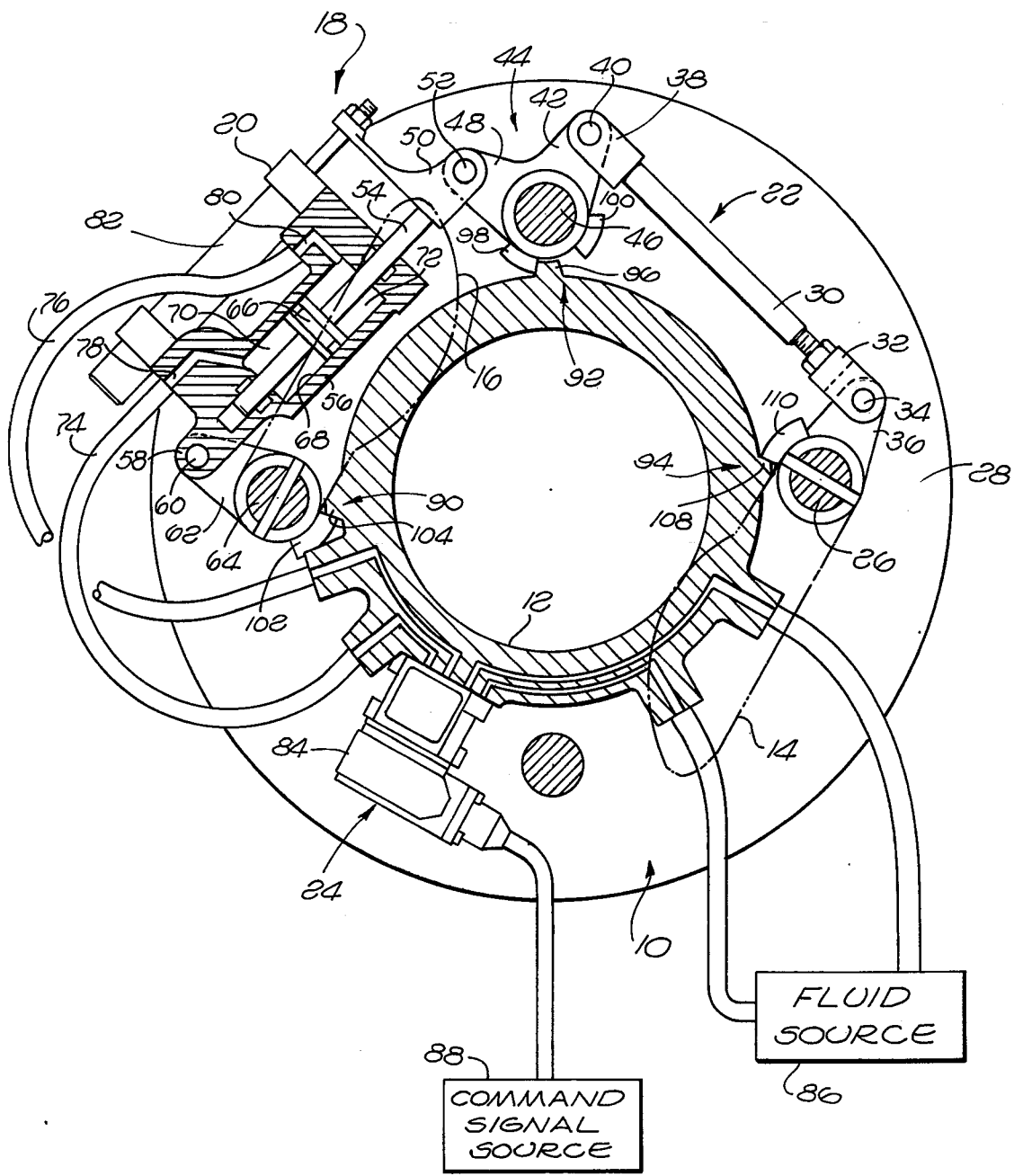
FIG. 1 is a schematic representation, partly in cross section illustrating one pair of control spoiler blades in position adjacent the nozzle exit of a rocket motor and in fully retracted position.

As is illustrated in FIG. 1, to which reference is hereby made, the nozzle exit 10 of a rocket motor (not shown) includes an aperture exit 12 about which is pivotally attached a pair of control spoiler blades 14–16. A single force applying means 18 illustrated as a hydraulic actuator 20 with appropriate mechanical linkages 22 applies force to selectively position one of the spoiler blades 14–16 within the nozzle aperture 12 to cause the exhaust gases therefrom to impinge against the spoiler blade and as a result, effect control of the apparatus to which the rocket motor is attached. Control signals are applied to a control mechanism 24 such as a hydraulic servovalve to apply hydraulic fluid under pressure to the actuator 20 responsive to the control signals applied to the control means 24.

Spoiler blade 14 is affixed to a spindle 26 which is journaled for rotation within the flange 28 on the nozzle exit 10. A pushrod 30 is pivotally attached by means of a clevis 32 and a pin 34 to one end 36 of the blade 14. The opposite end of the pushrod 30 is pivotally attached by means of a clevis 38 and a pin 40 to one arm 42 of a crank arm means 44. Crank arm means 44 is in turn affixed to a shaft 46 which is also journaled for rotation within the flange 28. A second arm 48 of the crank arm means 44 is pivotally attached by an appropriate clevis 50 and pin 52 means to the rod 54 extending from the body 56 of the hydraulic actuator 20. The body 56 of the actuator 20 is in turn connected, by means of an appropriate clevis 58 and pin 60 means, to one end 62 of the spoiler blade 16. The spoiler blade 16 is in turn attached to a shaft 64 which is also journaled for rotation within the flange 28 of the nozzle exit 10.

A piston 66 is positioned within a cylinder 68 formed within the body 56 of the actuator 20. The piston 66 is attached to the rod 54 and divides the cylinder 68 into chambers 70 and 72. Hydraulic connections such as flexible tubes 74 and 76 are connected, respectively, to the chambers 70 and 72 through the appropriate passageways 78 and 80, respectively. Thus, upon the application of hydraulic fluid under pressure, as will be more fully described hereinbelow, relative movement is caused to occur between the rod 54 and the body 56 of the actuator, thereby to position one or the other of the spoiler blades 14–16 within the nozzle aperture 12.

To provide position information regarding the particular position of the actuator 20 there is provided a feedback potentiometer 82 which is connected between the body 56 and the arm 54 of the actuator 20. Thus as the relative movement between the body 56 and arm 54 occurs an electrical signal is generated by the potentiometer 82 and is applied to appropriate signal-generating means (not shown) as is well known to those skilled in the art.

A servovalve 84 of the nozzle-lapper or jet-pipe may be used to control the flow of hydraulic fluid under pressure from a source 86 thereof to the actuator 20, responsive to command signals from the command signal source 88. The operation of the servovalve 84 to control the application of fluid to the hydraulic actuator 20 is well known to those skilled in the art and, therefore, a detailed description thereof is not believed necessary for purposes of understanding the construction and operation of the present invention.

Appropriate stop means is operatively associated with each of the spoiler blades 14–16 and the crankcar means 44 to effect movement of the desired spoiler blades 14–16 in response to the command signals from the source 88. Each of the stop means 90, 92 and 94 includes a stationary stop member such as indicated at 96 and a pair of movable stop members 98 and 100 illustrated in conjunction with the stop means 92. One of the movable stop means 102 used in conjunction with the stationary stop means 104 for the stop means 90 is also illustrated while with respect to the stop means 94 there is shown the stationary stop 108 and one of the movable stops 110. The other movable stops 106 and 112 which form a part of the stop means 90 and 94, respectively, are more fully illustrated in FIG. 3 and described hereinbelow.

In operation, it will be assumed first that it is desired to have the spoiler blade 14 moved into the exit aperture 12 of the nozzle exit 10. An appropriate command signal is applied from the source 88 to the servovalve 84 to apply hydraulic fluid, under pressure, through the conduit 74 and the passage 78 into the chamber 70. At the same time the return for the fluid source 86 is connected through the passageway 80 and the conduit 76 and the servovalve 84 to the chamber 72. Under these circumstances a differential pressure exits across the cylinder 66 with the high pressure in chamber 70 and the low pressure in chamber 72. Under these circumstances the piston 66 is commanded to move in such a way as to expand the volume of chamber 70. Since the actuator body 56 and rod 54 are not grounded (that is, firmly affixed to an immovable object) either can move to accomplish this expansion of the chamber 70. As will be noted, the movable stop 102 is positioned against the stationary stop 104 of the stop means 90. As a result, the body 56 is held in a fixed position since the end 62 of the blade 16 cannot rotate in a counterclockwise direction as viewed in FIG. 1. As a result, the piston 66 moves with respect to the body 56 such as to cause the rocker arm means 44 to rotate in a clockwise direction as viewed in FIG. 1. As such rotation occurs, the pushrod 30 also applies a force to the arm 36 of the blade 14, causing the blade 14 to also rotate in a clockwise direction, thus positioning the blade 14 within the nozzle exit aperture 12. It is noted that the stop means 92 and 94 are positioned such that the clockwise rotation of the rocker arm means 44 and the blade 14 is permitted to occur.

Through application of hydraulic fluid under pressure to the chamber 72 and the connection of the source return to the chamber 70, the differential pressure across the piston 66 is reversed from that above-described. The blade 14 will first be retracted from the nozzle exit aperture 12 before any absolute movement of the body 56 of the actuator 20. Such occurs because of the forces existing through the impingement of the exhaust gas in the nozzle exit aperture 12 against the blade 14. The forces generated by these exhaust gases will return the blade 14 and the piston 66 to the position illustrated in FIG. 1 which is the null position, when the forces generated by the hydraulic actuator are removed. If the fluid from the source under pressure continues to be applied to the chamber 72, the piston 66 is thereby commanded to move in such a manner as to expand the volume of the chamber 72. Since the stop means 92 and 94 are now in such a position that rocker arm means 44 can no longer move in a counterclockwise direction. Such has the effect of grounding the piston rod 54. Under these circumstances the actuator becomes a moving body actuator with the body 56 moving relative to the rod 54 so as to cause an expansion of the chamber 72. Under these circumstances the body applies forces to the end 62 of the blade 16 thereby causing the blade 16 to rotate in a clockwise direction into the nozzle exit aperture 12 so as to be in a position such that the exhaust gases impinge thereagainst to effect the desired control of the apparatus to which the rocket motor is attached. Again, when the fluid pressure is reversed the spoiler blade 16 is returned to the null position as shown in FIG. 1, as a result of the exhaust gases impinging thereagainst.

From the foregoing description it will be understood by those skilled in the art that a single force applying means in the form of a hydraulic actuator is used to selectively position one of a pair of control spoiler blades at a time into the exhaust aperture of a rocket motor for control purposes. When implemented into a full flight control system, those skilled in the art will recognize that an additional pair of spoiler blades are required and such are positioned in such a manner as to dispose a spoiler blade at equal 90° positions about the nozzle exit aperture 12. Thus the system as illustrated in FIG. 1 would be duplicated with a spoiler blade affixed to a shaft 90 and an additional spoiler blade affixed to a shaft positioned on the rotational axis of the shaft 46. A piston of this type constructed in accordance with the principles of the present invention is illustrated in FIG. 2, to which reference is now made.

Figure 2:
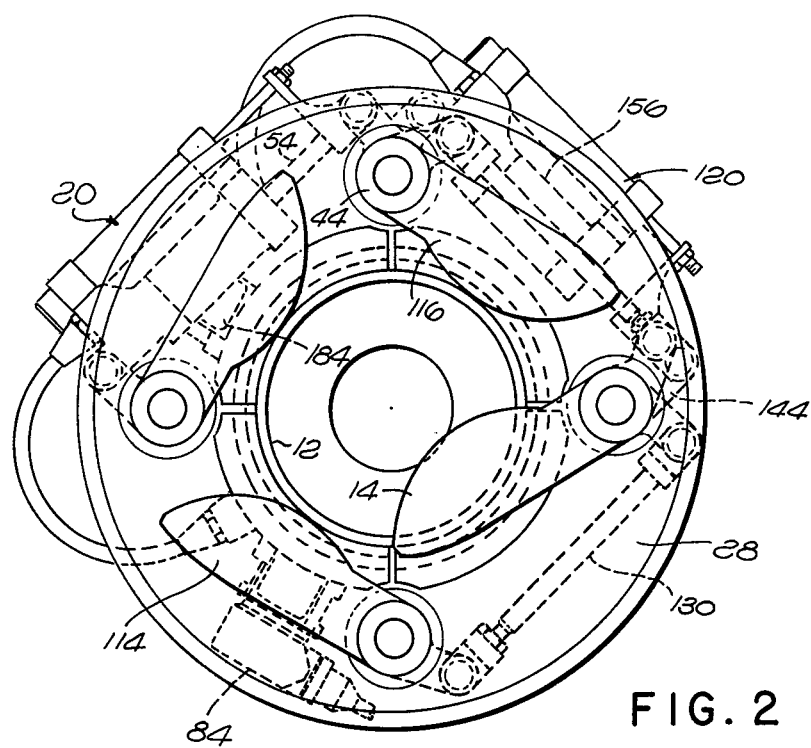
FIG. 2 is a view similar to FIG. 1 but illustrating two pair of control spoiler blades in position adjacent the nozzle exit of a rocket motor and with one blade in an extended position.

As is shown in FIG. 2 the actuator 20 has the rod 54 extending in such a manner that the blade 14 is positioned within the nozzle exit aperture 12 for control purposes. Such, for example, as to cause the apparatus to which the rocket motor is connected to yaw left. As is illustrated in FIG. 2, an additional opposed pair of spoiler control blades 114 and 116 are pivotally connected to the flange 28 in the same manner as above-described with respect to the blades 14 and 16. A pushrod 130 is connected between the blade 114 and a rocker arm means 144 which in turn is also pivotally connected to the rod of an actuator 120. The body 156 of the actuator 120 is connected pivotally to the blade 116. A servovalve 184 provides appropriate control of fluid from the source under pressure to the actuator 120 to individually position the spoiler blades 114 and 116 with respect to the nozzle exhaust aperture in the manner above described to thereby control the flight of the vehicle to which the rocket motor is attached in an axis opposite that of the spoiler blades 14 and 16. For example, the spoiler blades 14 and 16 would control the vehicle insofar as yaw is concerned while the blades 114 and 116 would control the vehicle insofar as pitch is concerned.

Figure 3:
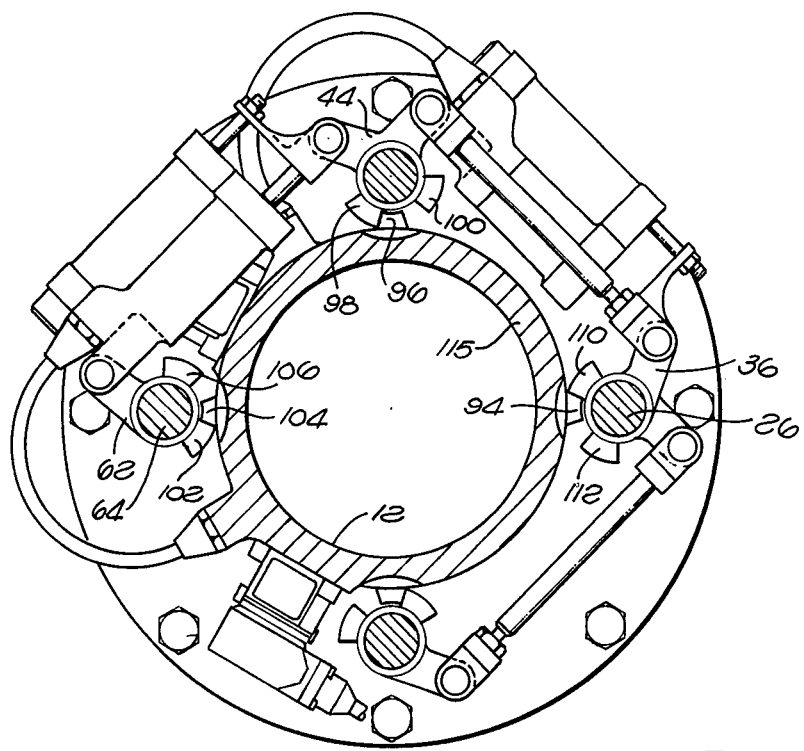
FIG. 3 is a schematic illustration partly in cross section further showing the positioning and operation of the stop means associated with the control means for the spoiler blades.

By reference now to FIG. 3, the construction of the stop means is illustrated in greater detail with respect to the yaw axis control. As is therein shown the stationary stops 94, 104 and 108 are formed integrally with the body 115 which defines the nozzle exit aperture 12 of the rocket motor. The movable stops 102 and 106 are formed as a part of the arm 62 which is keyed along with the blade 16 to the shaft 64 to thereby function as an integral unit. The movable stops 98 and 100 are formed integrally with the rocker arm means 44 and thus function as an integral unit therewith. The movable stops 110 and 112 are formed with the arm 36 which is keyed along with the blade 14 to the shaft 26 and thus functions as an integral unit therewith. It will thus be recognized by those skilled in the art that as the various portions of the control mechanism for applying force individually to one of the spoiler blades is limited in the amount of movement that can be effected through application of hydraulic fluid under pressure to the actuator insofar as the maximum movement thereof is concerned. It will, of course, be recognized by those skilled in the art that more precise and controlled movement is accomplished by the command signals in conjunction with the feedback signal from the position potentiometer to thereby position the desired spoiler blade by a precise amount into the exhaust gas stream exiting through the aperture 12 of the rocket motor.

What is claimed is:

1. A thrust vector or control system for a rocket motor having a nozzle exit end comprising:
    a pair of opposed control spoiler blades pivotally attached adjacent said nozzle exit end;
    actuator means;
    mechanical linkage means;
    first means for connecting said actuator means to one of said spoiler blades; and
    second means for connecting said linkage means between the other of said spoiler blades and said actuator means.

2. A thrust vector control system as defined in claim 1 which further includes a second pair of control spoiler blades, each of said blades being disposed at 90° intervals about said nozzle exit end.

3. A thrust vector control system for a rocket motor having a nozzle exit and comprising:
    (A) a pair of opposed control spoiler blades pivotally attached adjacent said exit end of said nozzle, each of said blades being independently rotatable from a null position into said nozzle exit to control the attitude of said motor;
    (B) stop means operatively engaging each of said blades for precluding further movement thereof away from said nozzle exit after reaching a predetermined null position;
    (C) idler crank means having first and second crankarms;
    (D) pushrod means pivotally connected between one of said spoiler blades and said first crankarm;
    (E) hydraulic actuator means having a body and a piston rod pivotally connected between the other spoiler blade and said second crankarm; and
    (F) control means for selectively supplying hydraulic fluid under pressure responsive to control signals applied to said actuator means thereby to relatively reciprocate said body piston rod of said actuator means, thereby to independently rotate one of said blades into said exit of said nozzle while retaining the other against said stop means in said null position.

4. A thrust vector control system as defined in claim 3 which further includes second stop means operatively engaging each of said blades for stopping movement of said blades into said nozzle exit beyond a predetermined amount.

5. A thrust vector control system as defined in claim 4 which further includes a second pair of opposed control spoiler blades pivotally attached adjacent said exit end of said nozzle and disposed to position a spoiler blade at 90° positions about said exit; and means for controlling the positioning of said second pair of said blades with respect to said nozzle exit separately from said pair of spoiler blades.

6. A thrust vector control system as defined in claim 5 wherein said means for controlling includes:
    (A) second stop means operatively engaging each of said second pair of blades for precluding further movement thereof away from said nozzle exit after reaching a predetermined null position;
    (B) second idler crank means having third and fourth crankarms;
    (C) second pushrod means pivotally connected between one of said second pair of spoiler blades and said third crankarm;
    (D) second hydraulic actuator means having a body and a piston rod pivotally connected between the other of said second pair of spoiler blades and said fourth crankarm; and
    (E) control means for selectively supplying hydraulic fluid under pressure responsive to control signals applied to said second actuator means thereby to relatively reciprocate said body and piston rod of said second actuator means, thereby to independently rotate one of said second pair of said blades into said exit of said nozzle while retaining the other against said second stop means in said null position.

* * * * *